United States Patent
Havinis et al.

(10) Patent No.: US 6,671,377 B1
(45) Date of Patent: Dec. 30, 2003

(54) SYSTEM AND METHOD FOR DOWNLOADING NETWORK INFORMATION TO MOBILE STATIONS FOR LOCATION CALCULATION

(75) Inventors: Theodore Havinis, Plano, TX (US); David Boltz, Garland, TX (US)

(73) Assignee: Ericsson Inc., Plano, TX (US)

( * ) Notice: Subject to any disclaimer, the term of this patent is extended or adjusted under 35 U.S.C. 154(b) by 0 days.

(21) Appl. No.: 09/272,692

(22) Filed: Mar. 18, 1999

(51) Int. Cl.[7] .................................................. H04K 1/00
(52) U.S. Cl. ...................... 380/258; 380/259; 380/262; 380/264; 380/281; 713/171; 455/433; 455/456
(58) Field of Search ................................ 380/258, 259, 380/262, 264, 281; 713/171; 455/433, 456

(56) References Cited

U.S. PATENT DOCUMENTS 5,577,122 A * 11/1996 Schipper et al. .............. 380/28
5,991,405 A * 11/1999 Mills ............................ 380/21
6,216,007 B1 * 4/2001 Havinis et al. ............. 455/456

OTHER PUBLICATIONS

Didier Samfat et al. "Untraceability in Mobile Networks" MOBICOM 95, 1995 ACM pp. 26–36.*

* cited by examiner

Primary Examiner—Gregory Morse
Assistant Examiner—Paul Callahan

(57) ABSTRACT

A telecommunications system and method is disclosed for downloading encrypted network information, such as Base Transceiver Station (BTS) coordinates, in a point-to-point manner between the network and a Mobile Station (MS) with location calculation capabilities. When an MS registers with the network, the MS shall indicate as part of the "early classmark" process its location calculation capabilities and the type algorithm to be used for deciphering the network information. As a result of a mobile originating request for assistance data, the network shall encrypt and download the network information to the MS. The MS deciphers the network information in order to position itself.

28 Claims, 11 Drawing Sheets

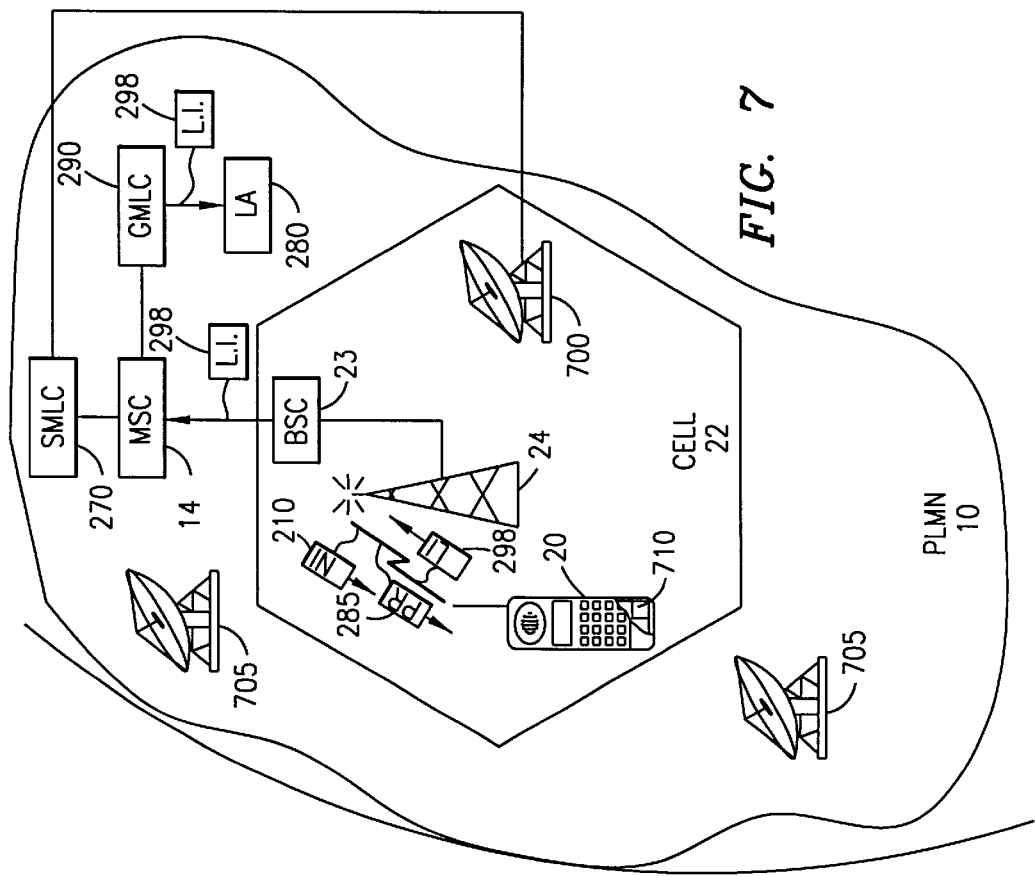
FIG. 7
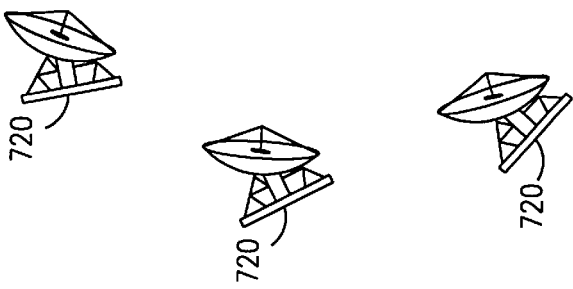

SYSTEM AND METHOD FOR DOWNLOADING NETWORK INFORMATION TO MOBILE STATIONS FOR LOCATION CALCULATION

BACKGROUND OF THE PRESENT INVENTION

1. Field of the Invention

The present invention relates generally to telecommunications systems and methods for positioning a mobile station within a cellular network, and specifically to providing encrypted network information to mobile stations for use in calculating the location of the mobile station.

2. Background and Objects of the Present Invention

Cellular telecommunications is one of the fastest growing and most demanding telecommunications applications. Today it represents a large and continuously increasing percentage of all new telephone subscriptions around the world. A standardization group, European Telecommunications Standards Institute (ETSI), was established in 1982 to formulate the specifications for the Global System for Mobile Communication (GSM) digital mobile cellular radio system.

With reference now to FIG. 1 of the drawings, there is illustrated a GSM Public Land Mobile Network (PLMN), such as cellular network 10, which in turn is composed of a plurality of areas 12, each with a Mobile Switching Center (MSC) 14 and an integrated Visitor Location Register (VLR) 16 therein. The MSC 14 provides a circuit switched connection of speech and signaling information between a Mobile Station (MS) 20 and the PLMN 10. The MSC/VLR areas 12, in turn, include a plurality of Location Areas (LA) 18, which are defined as that part of a given MSC/VLR area 12 in which the MS 20 may move freely without having to send update location information to the MSC 14 that controls the LA 18. Each LA 18 is divided into a number of cells 22. The MS 20 is the physical equipment, e.g., a car phone or other portable phone, used by mobile subscribers to communicate with the cellular network 10, each other, and users outside the subscribed network, both wireline and wireless.

The MSC 14 is in communication with at least one Base Station Controller (BSC) 23, which, in turn, is in contact with at least one Base Transceiver Station (BTS) 24. The BTS is the physical equipment, illustrated for simplicity as a radio tower, that provides radio coverage to the cell 22 for which it is responsible. It should be understood that the BSC 23 may be connected to several BTS's 24, and may be implemented as a stand-alone node or integrated with the MSC 14. In either event, the BSC 23 and BTS 24 components, as a whole, are generally referred to as a Base Station System (BSS) 25.

With further reference to FIG. 1, the PLMN Service Area or cellular network 10 includes a Home Location Register (HLR) 26, which is a database maintaining all subscriber information, e.g., user profiles, current location information, International Mobile Subscriber Identity (IMSI) numbers, and other administrative information, for subscribers registered within that PLMN 10. The HLR 26 may be co-located with a given MSC 14, integrated with the MSC 14, or alternatively can service multiple MSCs 14, the latter of which is illustrated in FIG. 1.

Determining the geographical position of an MS 20 within a cellular network 10 has recently become important for a wide range of applications. For example, location services (LCS) may be used by transport and taxi companies to determine the location of their vehicles. In addition, for emergency calls, e.g., 911 calls, the exact location of the MS 20 may be extremely important to the outcome of the emergency situation. Furthermore, LCS can be used to determine the location of a stolen car, for the detection of home zone calls, which are charged at a lower rate, for the detection of hot spots for micro cells, or for the subscriber to determine, for example, the nearest gas station, restaurant, or hospital, e.g., "Where am I" service.

As can be seen in FIG. 2 of the drawings, upon a network positioning request, the MSC 14 obtains, from the serving BTS 24 and BSC 23, a Timing Advance (TA) value, which corresponds to the amount of time in advance that the MS 20 must send a message in order for the serving BTS 24 to receive it in the time slot allocated to that MS 20. The TA value, in turn, provides location information regarding the MS 20 location. This is due to the fact that when a message is sent from the MS 20 to the BTS 24, there is a propagation delay, which depends upon the distance between the MS 20 and the BTS 24. The TA values are expressed in bit periods, and can range from 0 to 63, with each bit period corresponding to approximately 550 meters between the MS 20 and the BTS 24.

This TA value is forwarded to a Serving Mobile Location Center (SMLC) 270 for use in assisting the calculation of the geographical location of the MS 20. It should be noted that the SMLC 270 can use a number of different positioning mechanisms, including, but not limited to, Time of Arrival (TOA), which is a network-based positioning method, Enhanced Observed Time Difference (E-OTD) and Global Positioning System (GPS), which are both MS-based positioning methods. After the SMLC 270 calculates the MS 20 location, this location can be sent to a Location Application (LA) 280 that requested the positioning. It should be noted that the requesting LA 280 could be located within the MS 20 itself, within the MSC 14 or could be an external node, such as an Intelligent Network (IN) node. If the LA 280 is not within the MS 20 or within the MSC 14, the location information is sent to the requesting LA 280 via the MSC 14 and a Gateway Mobile Location Center (GMLC) 290.

As mentioned above, two common types of MS-based positioning methods are the E-OTD method and the GPS method. For the GPS method, the MS 20 can have a Global Positioning System (GPS) receiver built into it, which is used to obtain positioning data, which is sent to the SMLC 270 to determine the location of the MS 20. For the E-OTD method, the MS 20 can collect positioning data based on the Observed Time Difference (OTD) between the time a BTS 24 sends out a signal and the time the MS 20 receives the signal. This time difference information can be sent to the SMLC 270 for calculation of the location of the MS 20, or the MS 20 itself, with knowledge of the location of the BTS 24, can determine it's location. It should be noted that it is expected in the near future for the GPS receiver within the MS 20 to be able to calculate the MS 20 location.

By utilizing the E-OTD or GPS positioning method and implementing the location calculation functionality within the MS 20 itself, the location calculation can be performed even when the MS 20 is in idle-mode. However, for MS-based positioning methods, it is necessary that the MS 20 has knowledge of certain network information, such as the coordinates of a serving BTS 24. Although this network information can be broadcast over the Broadcast Control Channel (BCCH), many network operators may wish to avoid broadcasting such information for security reasons.

It is, therefore, an object of the present invention to encrypt and download network information, such as BTS coordinates, to MS's that have location calculation capabilities.

It is a further object of the present invention to allow the MS to decrypt the network information in order to use this network information in calculating the MS location information.

It is still a further object of the present invention to make the MS decryption ability dependent upon either the number of positionings originally requested or the duration of the positioning requested.

SUMMARY OF THE INVENTION

The present invention is directed to telecommunications systems and methods for downloading encrypted network information, such as BTS coordinates, in a point-to-point manner between the network and the MS with location calculation capabilities. When an MS registers with the network, the MS shall indicate as part of the "early classmark" process its location calculation capabilities and the type algorithm to be used for decrypting the network information. As a result of a mobile originating request for assistance data, the network shall encrypt and download the network information to the MS. The mobile originating request for assistance data shall also request from the network the location deciphering key $K_L$, and shall also indicate the number of positionings and/or the duration of the positioning to be performed by the MS. A subscriber identification key $K_i$ retrieved from HLR, along with a non-predictable random number and the number and/or duration of positionings provided by the MS shall be used as input to a new algorithm to derive a location deciphering key $K_L$. Using the derived key $K_L$, the network information is ciphered by the MSC and transmitted to the MS. The MS uses the $K_i$, stored therein, and the random number, which is transmitted to the MS from the MSC, along with the new algorithm for deciphering network information and the number and/or duration of positionings requested by the MS to produce the $K_L$, which is used by the MS to decipher the network information. In addition, the number of positionings and/or the duration of the positioning is constantly compared by the MS with the $K_L$, and if the requested limit is reached, the $K_L$ becomes invalid and the MS can no longer decipher the broadcasted encrypted network information. Advantageously, the encryption and deciphering process of the present invention can be utilized by the network to charge a mobile subscriber either on a per positioning request basis or on a positioning duration basis.

BRIEF DESCRIPTION OF THE DRAWINGS

The disclosed invention will be described with reference to the accompanying drawings, which show important sample embodiments of the invention and which are incorporated in the specification hereof by reference, wherein:

FIG. 3 illustrates providing a serving mobile location center with various terminal-based positioning methods that a particular mobile station is capable of;

FIG. 7 illustrates a sample Global Positioning System (GPS) positioning method in accordance with embodiments of the present invention;

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
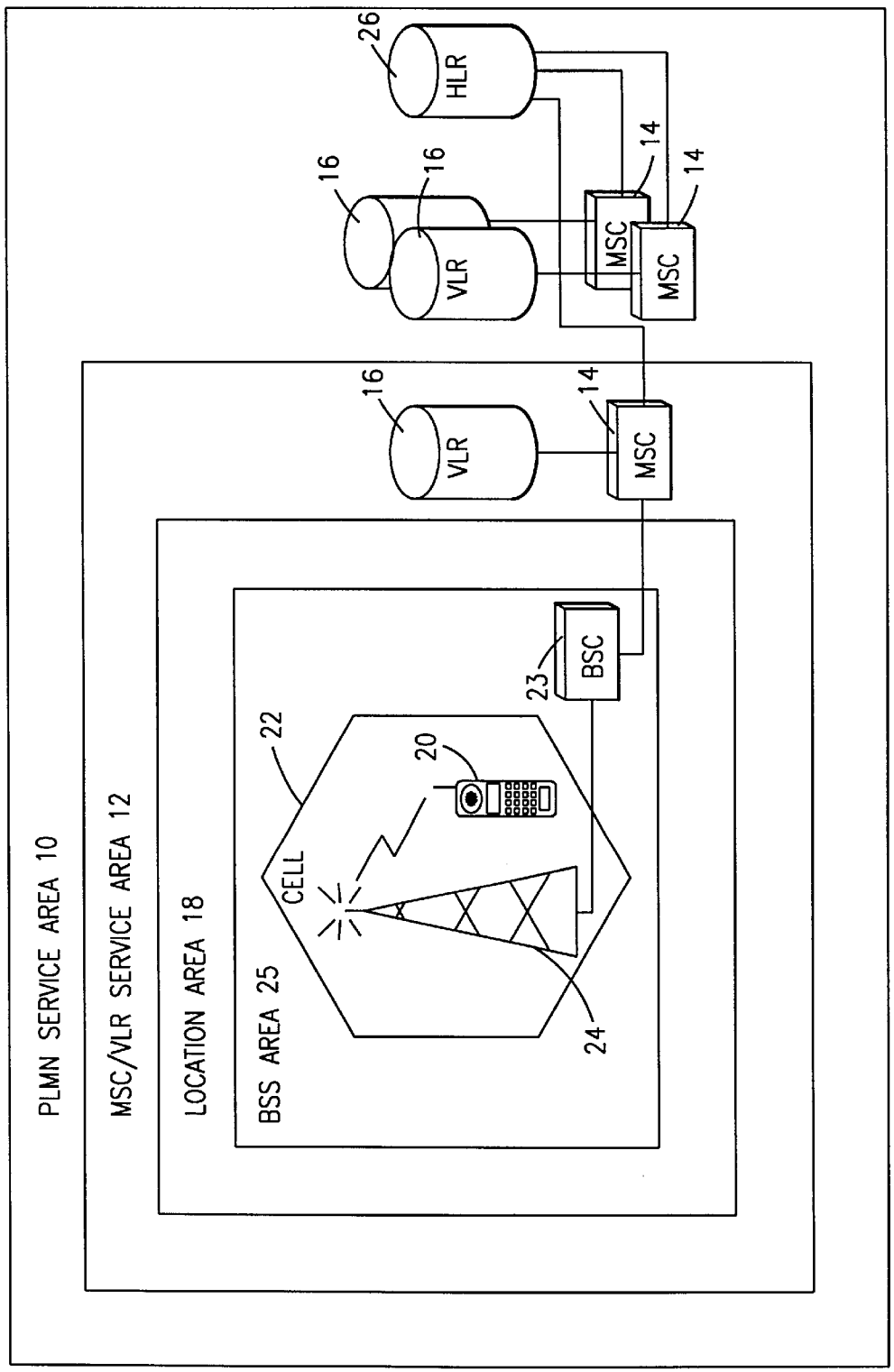
FIG. 1 is a block diagram of a conventional wireless telecommunications system.
Figure 2:
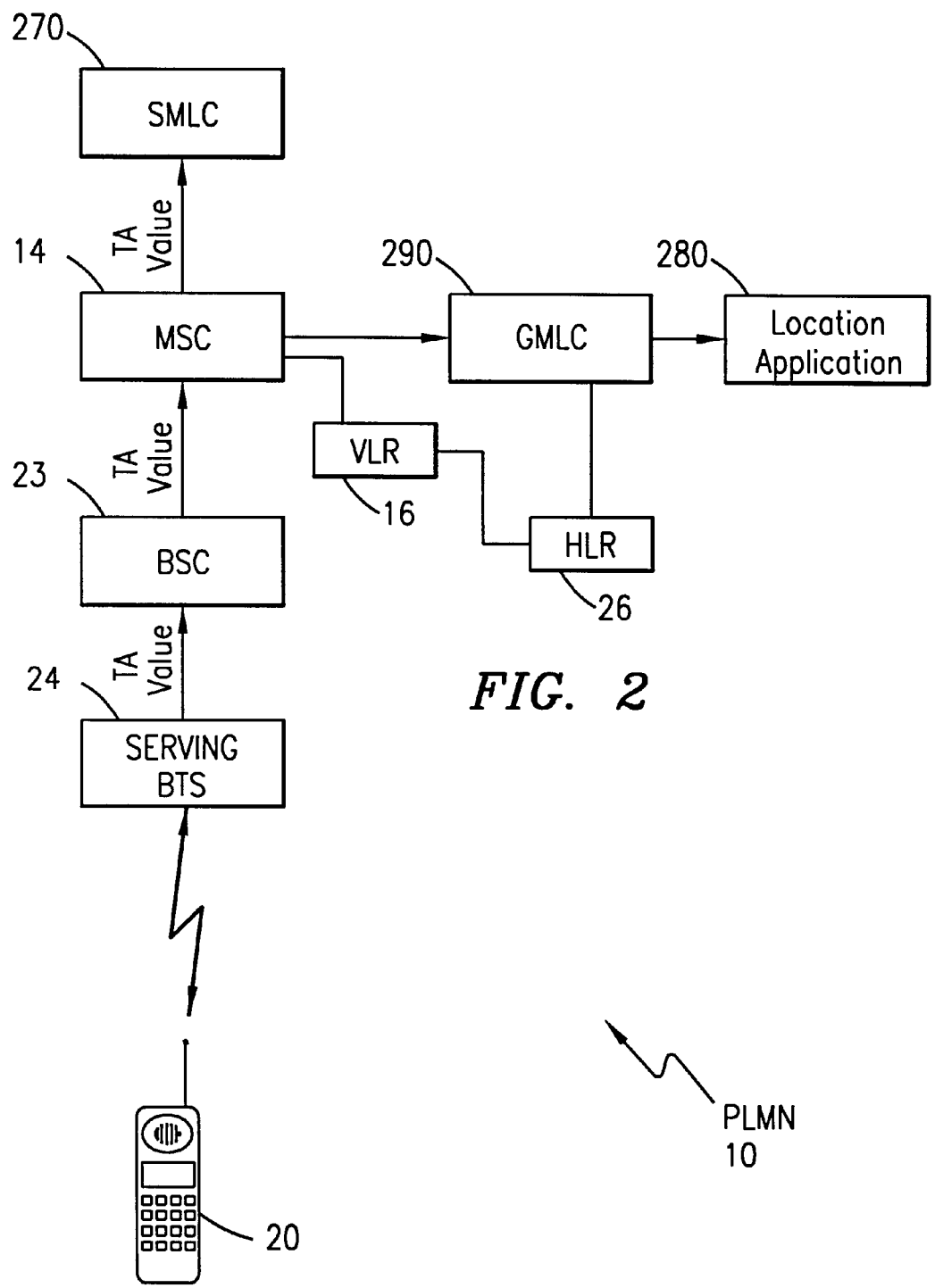
FIG. 2 is a block diagram illustrating the positioning of a mobile station within a cellular network.
Figure 3:
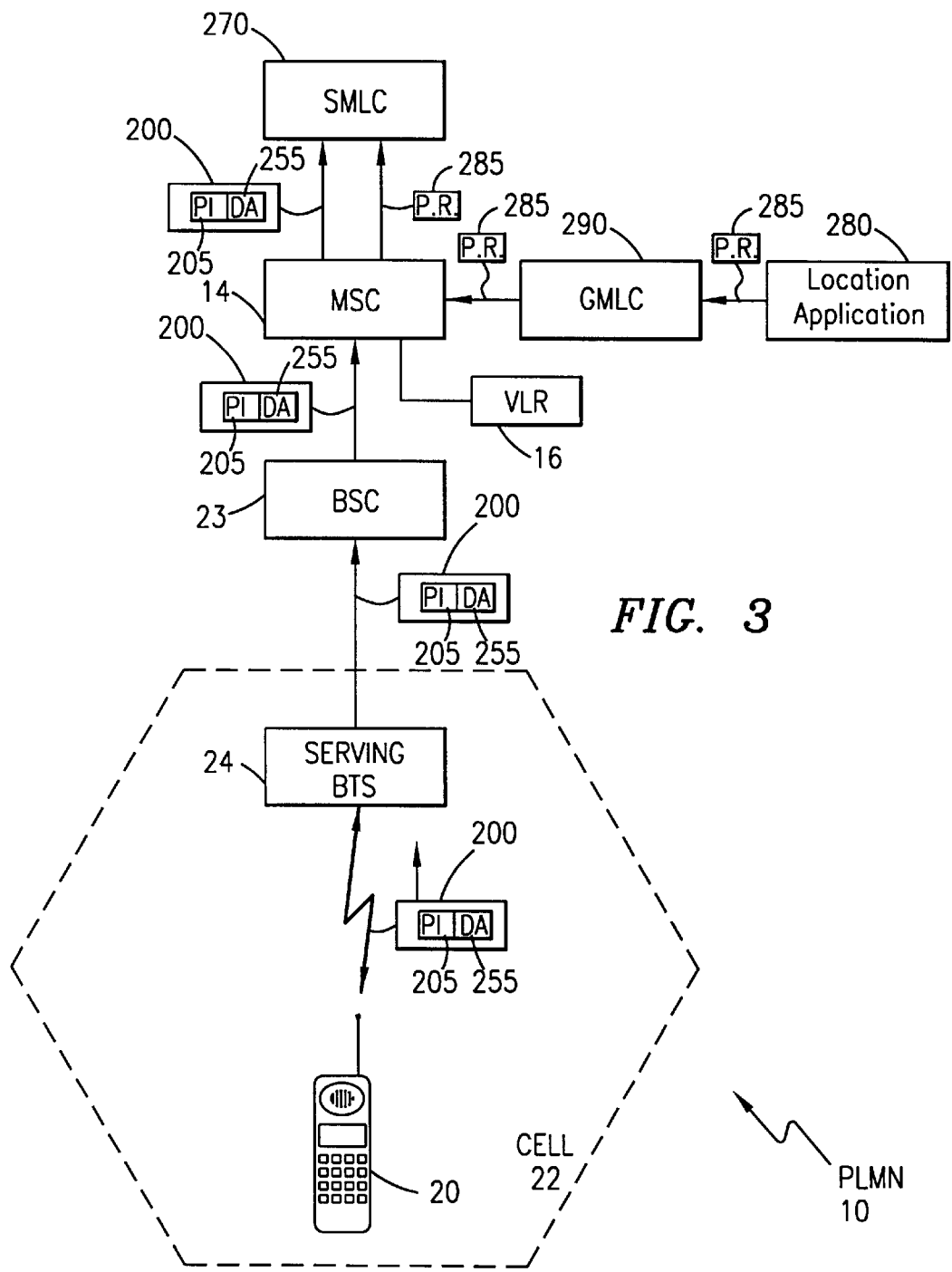

With reference now to FIG. 3 of the drawings, when a positioning request 285 for a particular target Mobile Station (MS) 20 is received by a Serving Mobile Location Center (SMLC) 270 serving a cell 22 within the Public Land Mobile Network (PLMN) 10 that the MS 300 is currently located in, the SMLC 270 must choose the optimum positioning method available. Positioning methods can be network-based, e.g., Timing Advance (TA) method, Time of Arrival (TOA) method, or Angle of Arrival (AOA) method, or terminal-based, e,g., Global Positioning System (GPS) method, Observed Time Difference (OTD) method, or Enhanced OTD (E-OTD) method. In order for the SMLC 270 to have knowledge of the terminal-based positioning methods, this information must be sent to the SMLC 270 together with the positioning request 285. Therefore, the MS 20 positioning capabilities can be sent to a serving Mobile Switching Center/Visitor Location Register (MSC/VLR) 14/16 when the MS 20 registers with the MSC/VLR 14/16.

For example, in GSM systems, the MS 20 positioning method capabilities can be passed towards the MSC/VLR 14/16 with the existing GSM message BSSMAP CLASSMARK UPDATE 200, as is understood in the art. Specifically, as discussed in co-pending patent application Ser. No. 09/037,071 to Stephen Hayes et al., which is hereby incorporated by reference, the "classmark information element 3" included within the CLASSMARK UPDATE message 200 can be extended to include MS 20 positioning capabilities 205. As is known in the art, the CLASSMARK UPDATE message 200 typically describes attributes of the MS 20, such as encryption capabilities, RF power level supported and short message capability. For example, the MS 20 positioning methods can be sent towards the network 10 as part of controlled early classmark sending, during dedicated mode, when the MS 20 wishes to indicate to the MSC/VLR 14/16 a change of positioning capabilities, after a BSSMAP CLASSMARK REQUEST message from the MSC/VLR 14/16, in which case the MS 20 can send the CLASSMARK UPDATE message 200. Alternatively, the MS 20 can send a HANDOVER REQUEST message (not shown) including the MS 20 positioning capabilities 205 to the target BSC 23 via a Base Transceiver Station (BTS) 24.

This positioning capability information 205 included within the CLASSMARK UPDATE message 200 shall indicate to the MSC/VLR 14/16 whether the MS 20 can support terminal-based positioning, the type of terminal-based positioning methods supported, whether the MS 20 is capable of performing location calculations based upon the positioning measurements that it performed itself and the type of algorithm 255 that the MS 20 uses to decipher broadcasted encrypted network information, e.g., BTS 24 coordinates. The deciphering algorithm information 255 included within the positioning capability information 205 indicates to the MSC 14 that the MS 20 is capable of deciphering encrypted broadcasted network information, as well as the types of deciphering algorithms that the specific MS 20 supports. Once the MSC/VLR 14/16 receives the terminal-based positioning methods, this information can be sent to the SMLC 270 for later use in determining the optimum positioning method. Thus, if the MS 20 has terminal-based positioning capabilities, along with terminal-based location calculation abilities, when the SMLC 270 receives the positioning request 285, the SMLC 270 can opt to allow the MS 20 to both obtain positioning measurements and to calculate it's own location based upon those positioning measurements. In addition, the MSC 14 can use the deciphering algorithm information 255 to enable the BSC 23 to encrypt network information and broadcast this encrypted network information to the MS 20 to enable the MS 20 to calculate its location.

Figure 4A:
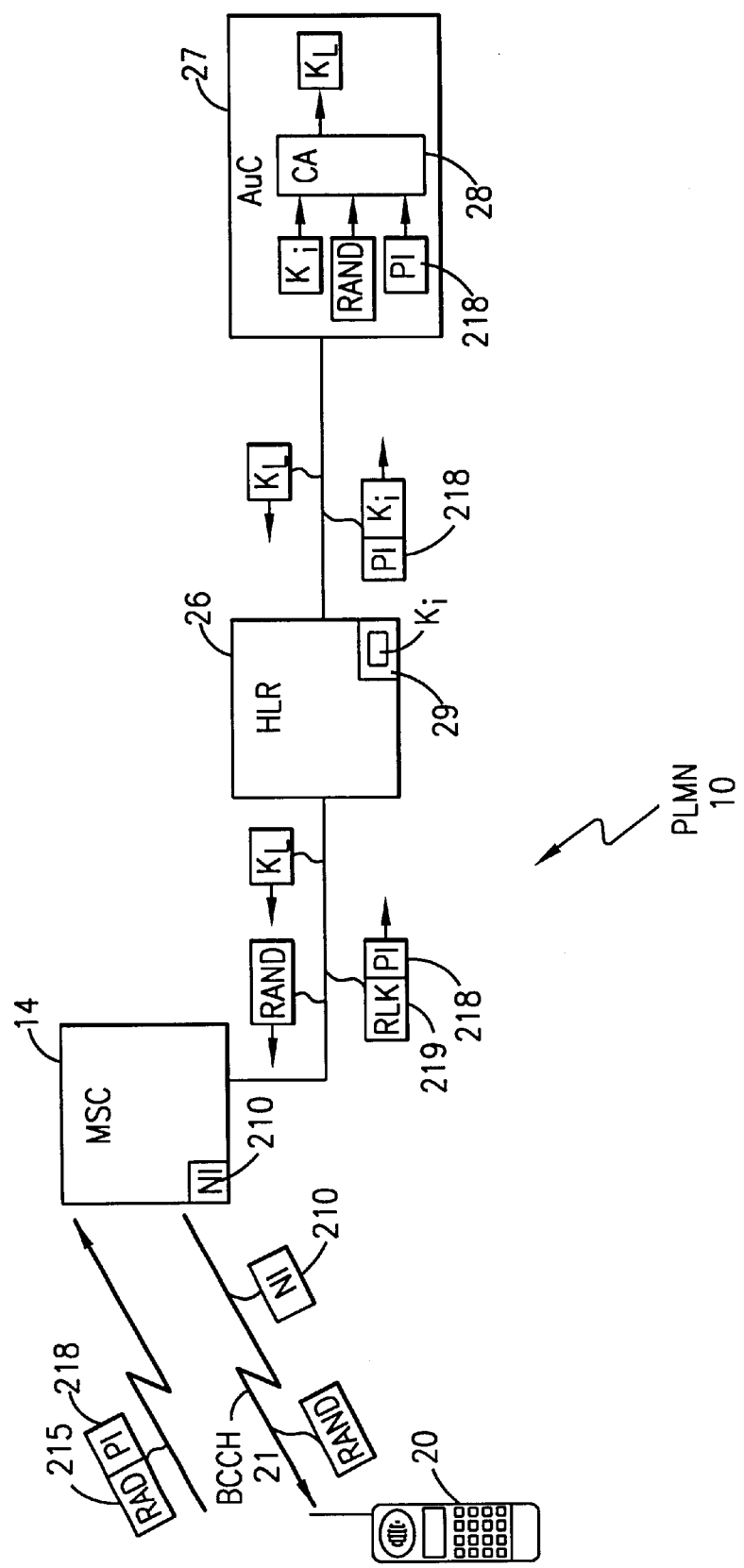
FIGS. 4A and 4B illustrate the encrypting and deciphering of network information for terminal-based location calculation in accordance with embodiments of the present invention.

As shown in FIG. 4A of the drawings, when an MS 20 performs its own location calculation, the MS 20 does not need to involve the network 10 in the positioning process except to obtain access to network information 210, e.g., BTS 24 coordinate information, for each positioning or for a period of continuous positioning. Thus, when an MS 20 needs to obtain network information 210 in order to position itself, the MS 20 can send a mobile originating request for assistance data 215, which requests from the network 10 a location deciphering key $K_L$ and includes a positioning indication 218 that indicates to the network 10 the number and/or duration of the positionings that the MS 20 will be performing, to the MSC 14.

In response to the request for assistance data 215, the MSC 14 sends a Security-Related_Information_Request 219, which includes the positioning indication 218, to a Home Location Register (HLR) 26 associated with the MS 20. The HLR 26 preferably has an Authentication Center (AuC) 27 attached thereto. The AuC 27 fetches a subscriber identification key $K_i$ stored within a subscriber record 29 associated with the MS 20 from the HLR 26 and uses this identification key $K_i$ together with a non-predictable random number RAND and the positioning indication 218, which indicates the number of positioning requests, as an input to a ciphering algorithm 28, which corresponds to the deciphering algorithm 255 supported by the MS 20, to derive the location deciphering key $K_L$. The location deciphering key $K_L$ is sent back to the MSC 14 for use, by the BSC 23, in encrypting the network information 210. This encrypted network information 320 is transmitted to the MS 20 over, for example, a Broadcast Control Channel (BCCH) 21.

Figure 4B:
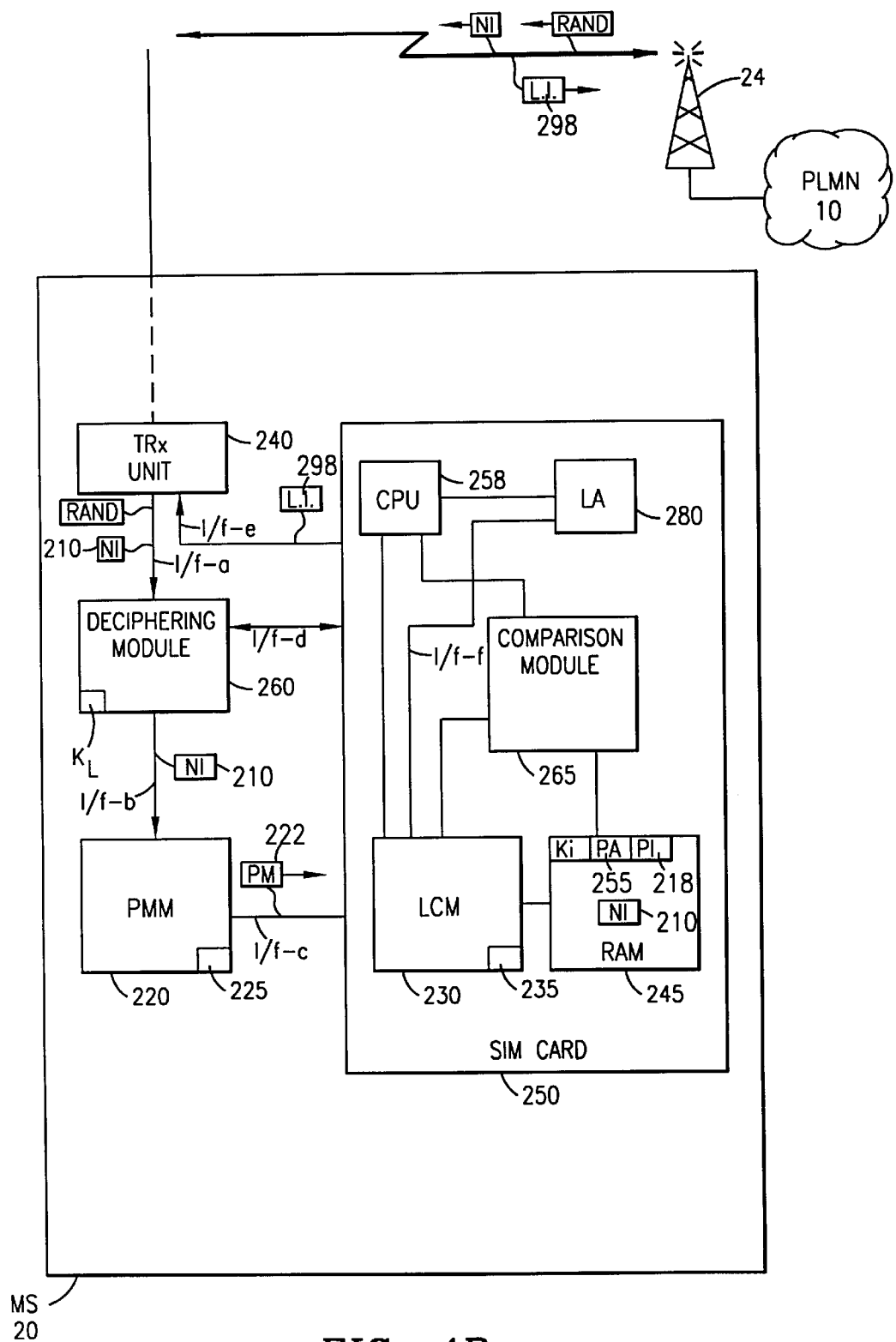

With reference now to FIG. 4B of the drawings, on the MS 20 side, in order to use the broadcasted network information 210, e.g., BTS 24 coordinates, the MS 20 must decipher the received encrypted network information 210. The MS 20 has stored in a non-volatile memory, such as a Random Access Memory (RAM) 245, within a smart card, such as a Subscriber Identity Module (SIM) card 250, the subscriber identification key $K_i$, the algorithm 255 for deciphering the network information 210, which was previously sent to the MSC 14 in the CLASSMARK UPDATE message 200, and the positioning indication 218, which includes the number and/or duration of positionings requested by the MS 20 in the request for assistance data message 215. In addition, the MSC 14 broadcasts unencrypted the random number RAND, which was used by the MSC 14 in deriving the location deciphering key $K_L$.

The random number RAND and the encrypted network information 210 are received by a transceiver (TRX) unit 240 within the MS 20 and transferred over interface I/f-a to a deciphering module 260 within the MS 20. The deciphering module 260 accesses the memory 245 over interface I/f-d and retrieves the subscriber identification key $K_i$, the algorithm 255 for deciphering the network information 210 and the positioning indication 218, and inputs the subscriber identification key $K_i$, the positioning indication 218 and the random number RAND into the deciphering algorithm 255 to produce the location deciphering key $K_L$. The deciphering module 260 uses this location deciphering key $K_L$ to decipher the received network information 210. Once the deciphering module 260 deciphers the received network information 210, this deciphered network information 210 is stored in the memory 245 in the SIM card 250 for later use in calculating the MS 20 location.

Specifically, the location calculation within the MS 20 can be carried out by utilizing a Positioning Measurement Module (PMM) 220 within the MS 20 for performing positioning measurements 222 with the aid of the deciphered network information 210, which is sent over interface I/f-b from the deciphering module 260, and an algorithm 225 specific to the positioning method used. When the PMM 220 obtains the positioning measurements 222, the PMM 220 sends the positioning measurements 222 to a Location Calculation Module (LCM) 230 within the SIM card 250, over interface I/f-c. Thereafter, the LCM 230 converts the positioning measurements 222 to location information 298, e.g., X,Y coordinates, with the aid of the stored network information 210 in memory 245 and an algorithm 235 for performing the conversion.

In preferred embodiments of the present invention, once the LCM 230 calculates the location information 298, a comparison module 265 within the SIM card 250 compares the number and/or duration of positionings performed with the requested number and/or duration of positionings 218, using, e.g., modulo-2 arithmetic. If the number and/or duration of positionings performed equals or exceeds the number and/or duration of positioning requested 218, the comparison module 265 invalidates the location deciphering key $K_L$ and the deciphering module 260 can no longer decipher the encrypted broadcasted network information 210.

Once the LCM 230 completes the location calculation process, the LCM 230 can transmit the calculated location information 298, which can be, for example, a single MS 20 location 298, the MS 20 location 298 over a certain period of time or a certain number of calculated MS 20 locations 298, to the requesting LA 280 by passing the location information 298 to either the TRX unit 240 over interface I/f-e for transmission to an LA 280 within the network 10 or to an internal LA 280 over interface I/f-f. In addition, it should be understood that the SIM card 250 preferably contains a central processing unit (CPU) 258 for controlling the flow of information between the PMM 220, LCM 230, RAM 245, deciphering module 260, comparison module 265, TRX unit 240 and any internal LA 280.

Figure 5:
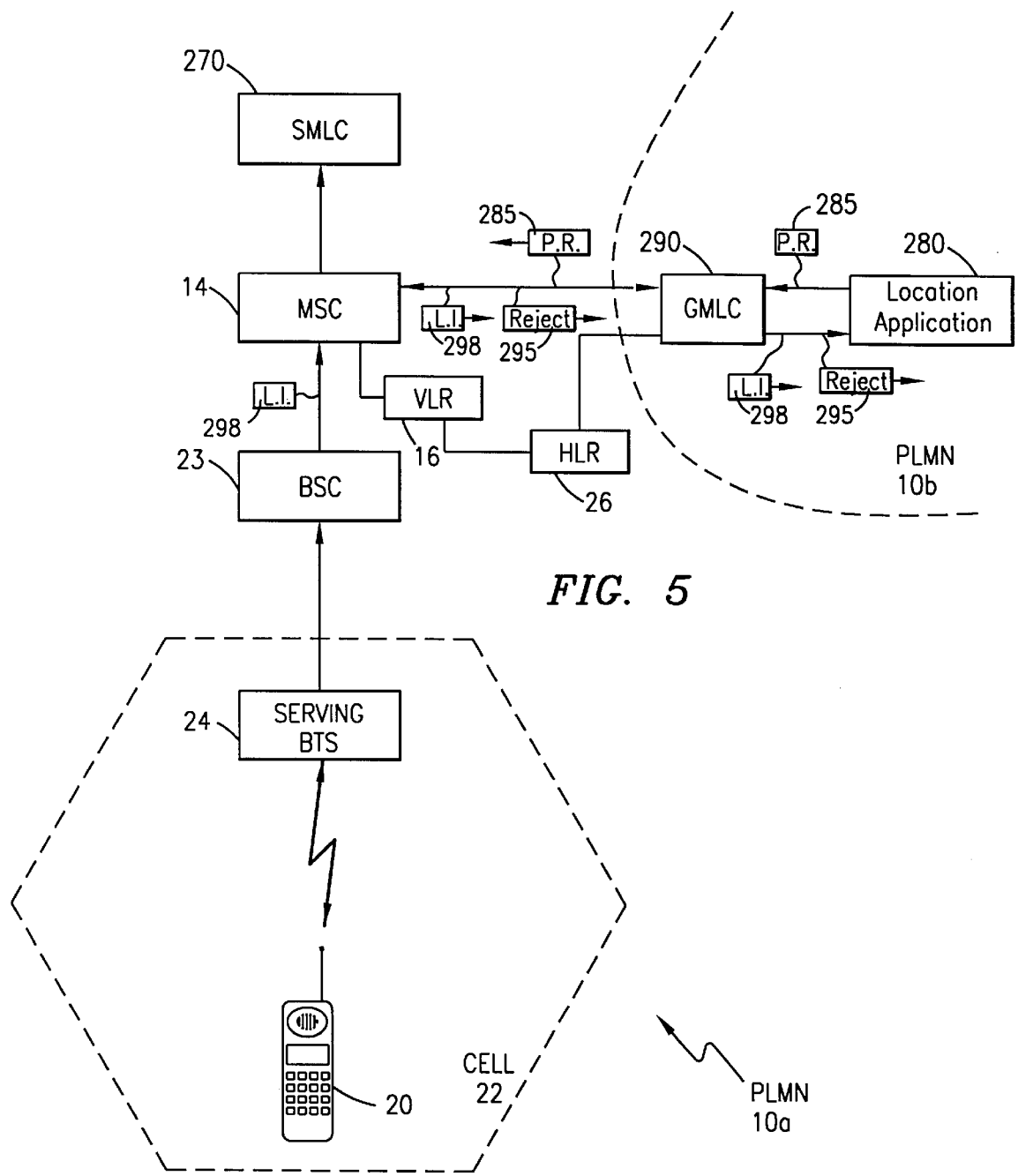
FIG. 5 illustrates a sample positioning process in accordance with embodiments of the present invention.
Figure 6:
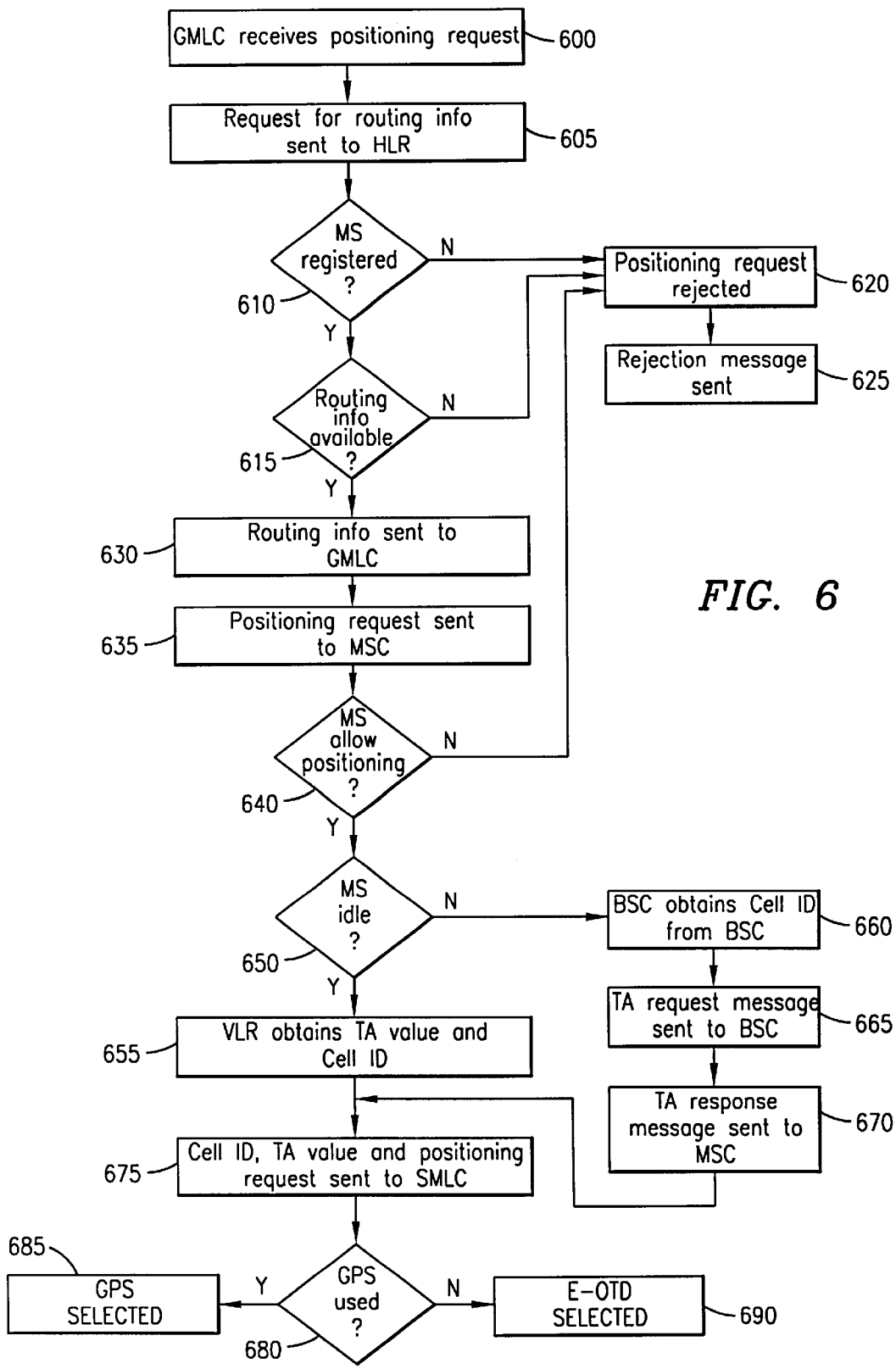
FIG. 6 shows steps in implementing the sample positioning process shown in FIG. 5 of the drawings.

A more complete understanding of aspects of the positioning process involved in the present invention will now be described with reference to FIG. 5 of the drawings, which will be described in connection with the steps listed in FIG. 6 of the drawings. Positioning of a particular target MS 20 typically begins by a Location Application (LA) 280 (or location node 280) sending a positioning request 285, which specifies the particular Mobile Station Integrated Services Digital Network (MSISDN) number associated with the particular target MS 20 to be positioned, to a Gateway Mobile Location Center (GMLC) 290 within the Public Land Mobile Network (PLMN) 10b of the LA 280 (step 600). In addition, the positioning request 285 can include the duration and/or number of positionings to be performed by the MS 20, as discussed hereinbefore.

When the GMLC 290 receives the positioning request 285 (step 600), the GMLC 290 sends a request for routing information (step 605), e.g., the address of the serving MSC 14 within the PLMN 10a that the MS 20 is currently located in, to the MS's Home Location Register (HLR) 26, using the MS's 20 directory number as a global title. The signaling network, e.g., the Signaling System #7 (SS7) network (not shown), can perform a global title translation on the MSISDN and route the request to the appropriate HLR 26 for the MS 20.

The HLR 26 checks its records to confirm that the MS 20 is registered in the HLR 26 (step 610), and that routing information for that MS 20 is available (step 615). If the MS 20 is not registered in the HLR 26 (step 610) or the routing information is not available (step 615), the positioning request 285 is rejected (step 620) and the GMLC 290 sends a rejection message 295 to the requesting LA 280 (step 625). However, if the MS 20 is registered in the HLR 26 (step 610) and routing information for the MSC 14 is available (step 615), the routing information, e.g., the MSC 14 address, is sent to the GMLC 290 (step 630). Using this MSC 14 address, the GMLC 290 transmits a MAP_PROVIDE_SUBSCRIBER_LOCATION message, which contains the positioning request 285, to the serving MSC 14 (step 635).

The MSC 14 verifies that the MS 20 allows positioning to be performed (step 640), e.g., by checking privacy information, such as a Subscriber Location Privacy Profile (SLPP), which is sent to a Visitor Location Register (VLR) 16 associated with the serving MSC 14 by the HLR 26. If the MS 20 does not allow positioning (step 640), the positioning request 285 is rejected (step 620) and a rejection message 295 is sent to the LA 280 (step 625).

However, if the MS 20 does allow positioning (step 640), and the MS 20 is in idle mode (step 650), the VLR 16 performs paging and authentication of the MS 20, along with ciphering of the positioning data. This procedure provides the current cell 22 ID and Timing Advance (TA) value for a serving Base Transceiver Station (BTS) 24 in a BSSMAP Complete layer 3 message, which is used to convey a paging response (step 655). However, if the MS 20 is in dedicated mode (step 650), e.g., involved in a call connection, the MSC 14 obtains the current cell 22 ID from a serving Base Station Controller (BSC) 23 (step 660) and sends a BSSMAP TA request to the serving BSC 23 (step 665). The serving BSC 23 obtains a current TA value from the serving BTS 24 and returns this current TA value in a BSSMAP TA response to the MSC 14 (step 670).

Upon receipt of the current cell 22 ID and TA value (step 655 or 670), the MSC 14 sends a MAP_PERFORM_LOCATION message, which includes the current cell 22 ID and TA value, to the SMLC 270 associated with the MS's 20 current cell 22 location (step 675). The SMLC 270 determines the positioning method to use, e.g., Time of Arrival (TOA), Enhanced Observed Time Difference (E-OTD) or Global Positioning System (GPS) (step 680). If the positioning is successful, the MSC 14 returns the location information 298 to the LA 280, via the GMLC 290.

In accordance with aspects of the present invention, two of the terminal-based positioning methods will now be described. One of these terminal-based positioning methods is the Global Positioning System (GPS) method. GPS is a well-known technology used by many military and civilian applications. It is based upon a constellation of satellites launched by the U.S. government beginning in 1978. The GPS satellites transmit the standard positioning service (SPS) signal, which is available for civilian applications on a 1575.42 MegaHertz carrier. Each satellite uses a unique 1023-chip Gold code at a rate of 1.023 MegaHertz, such that all codes repeat at 1 millisecond intervals.

Each satellite also transmits a unique 50 bit/second navigation message containing parameters that allow GPS receivers on earth to compute a precise position solution. The navigation message includes a precise time reference as well as parameters that precisely describe the orbital positions and clock corrections for the satellites. In general, GPS receivers compute a position solution by searching for all visible satellites, which can be accomplished by correlating the received signal with replicas of the respective Gold codes, demodulating the navigation message of each visible satellite to obtain a time reference and orbital position, computing a range estimate for each visible satellite that includes the GPS receiver clock uncertainty, and, if at least four satellites are visible, computing the GPS receiver position and clock correction using the range estimate.

Figure 8:
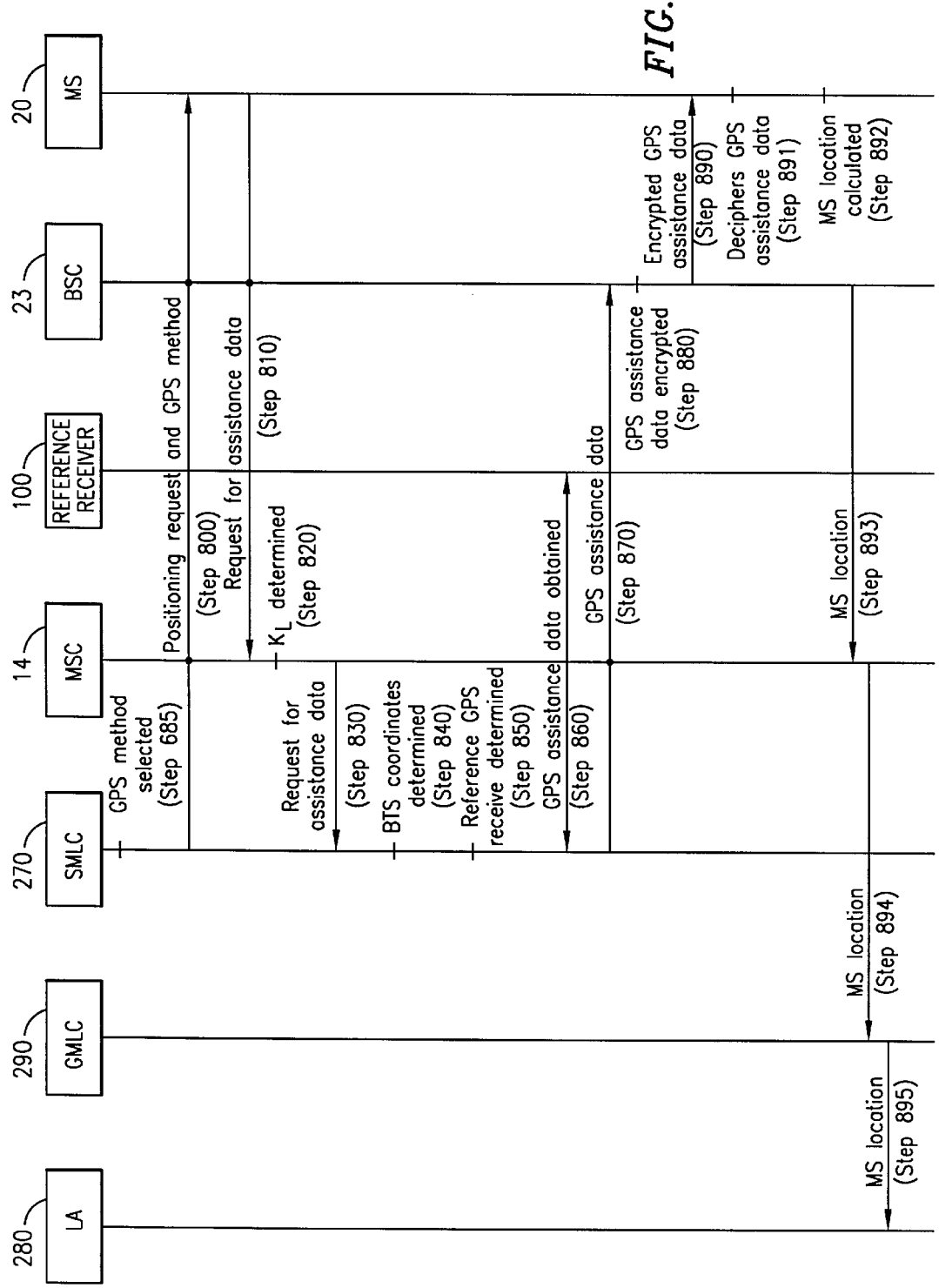
FIG. 8 shows steps in implementing the sample GPS positioning method shown in FIG. 7 of the drawings.

With reference now to FIG. 7 of the drawings, which will be described in connection with the steps listed in FIG. 8 of the drawings, when the SMLC 270 receives the cell 22 ID and TA value (step 675 in FIG. 6 of the drawings) and decides to utilize the GPS positioning method (steps 680 and 685 in FIGS. 6 and 8 of the drawings), the SMLC 270 can send the positioning request 285 and GPS positioning method to the MS 20 (step 800). Since the MS 20 typically needs network information 210 to calculate it's location, the MS 20 sends the request for assistance data message 215, discussed in connection with FIG. 4A of the drawings, to the MSC 14 (step 810). The MSC 14 determines the location deciphering key $K_L$ (step 820), which is later used to encrypt the network information 210 (step 880). The MSC 14 forwards the request for assistance data 215 to the SMLC 270 (step 830), which determines the coordinates of the serving BTS 24 (step 840), and from this information, as discussed in co-pending patent application Ser. No. 09/063, 028 to Christopher H. Kingdon et al., which is hereby incorporated by reference, the SMLC 270 can determine a reference GPS receiver 700 (step 850), which is valid for the cell 22 that the MS 20 is located in. Alternatively, the SMLC 270 can determine the correct reference GPS receiver 700 (step 850) just from the cell 22 ID.

Multiple reference GPS receivers 700 and 705 are spaced throughout the PLMN 10 in order to provide accurate assistance GPS data to GPS receivers 710 within or attached to MS's 20. This data is used by the built-in GPS receiver 710 to determine the location of the MS 20 within the PLMN 10. The data in each reference GPS receiver 700 and 705 is valid in a radius of up to 300 kilometers around the reference GPS receiver 700 and 705 site (except for differential correction information, which is only valid for a radius of up to 50 kilometers), and therefore, the correct reference GPS receiver 700 for the cell 22 that the MS 20 is in must be determined to ensure the accuracy of the assistance GPS data. In addition, each reference GPS receiver 700 and 705 must be placed such that the antenna has an unobstructed view of the full sky.

After the SMLC 270 has determined the correct reference GPS receiver 700 (step 850), the SMLC 240 obtains, from the reference GPS receiver 700, the relevant assistance GPS data 210 (step 860), such as the identity of the visible satellites 720, the orbital parameters of the satellites 720, clock corrections and differential corrections. A current requirement is that this assistance data be updated by the reference GPS receivers 700 and 705 about every thirty minutes (except for differential corrections, which are updated about every five seconds).

Once the current assistance GPS data 210 is obtained by the SMLC 270 (step 860), this information is forwarded to the BSC 23 (step 870) via the MSC 14, where it is encrypted (step 880) and broadcast to the built-in or attached GPS receiver 720 within the MS 20 (step 890) via the serving BSC 23 and BTS 24. This assistance data 210 corresponds to the network information 210 described in FIGS. 4A and 4B of the drawings. In addition, the built-in GPS receiver 270 encompasses at least the PMM 220 and LCS 230 shown in FIG. 4B of the drawings.

After deciphering the GPS assistance data 210 (step 891), the built-in GPS receiver 720 within the MS 20 can use this GPS assistance data 210 to obtain the GPS positioning measurements 222, shown in FIG. 4B of the drawings, and calculate its position 298 (step 892), e.g., latitude and longitude. The MS 20 can send this calculated location information 298 to the requesting LA 280 (step 895), via the MSC 14 (step 893) and the GMLC 290 (step 894).

Figure 9:
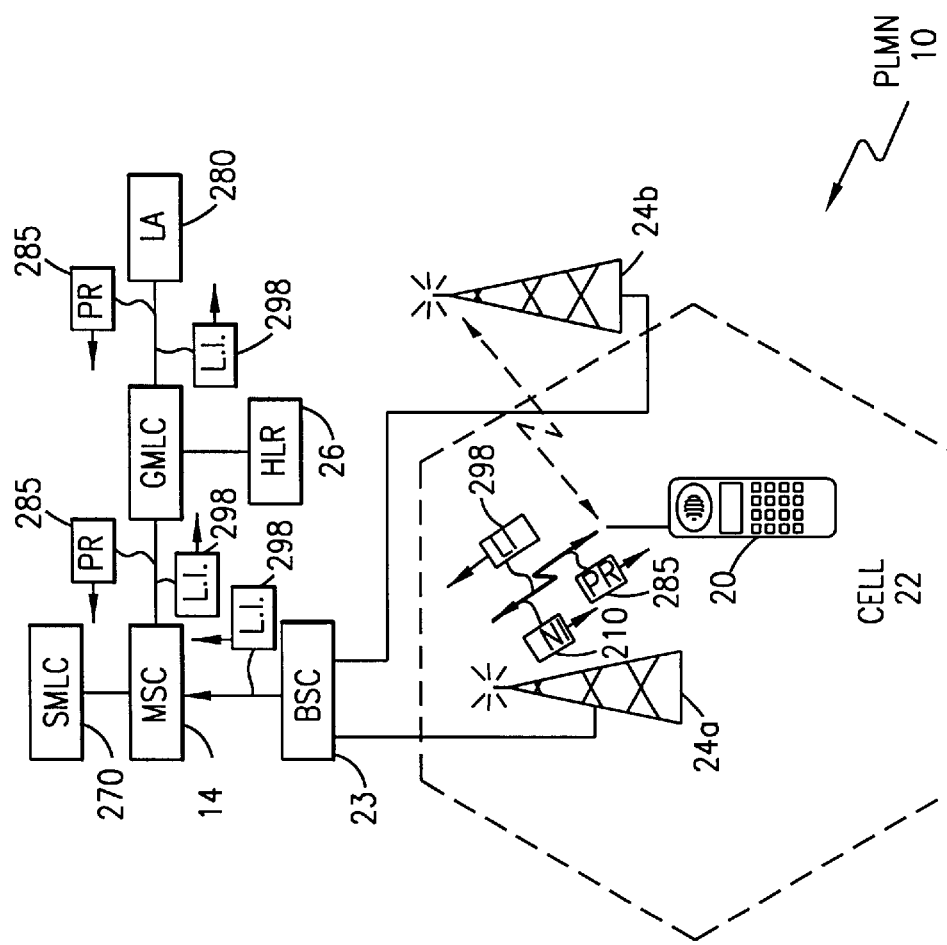
FIG. 9 illustrates a sample Enhanced-Observed Time Difference (E-OTD) positioning method in accordance with embodiments of the present invention.
Figure 10:
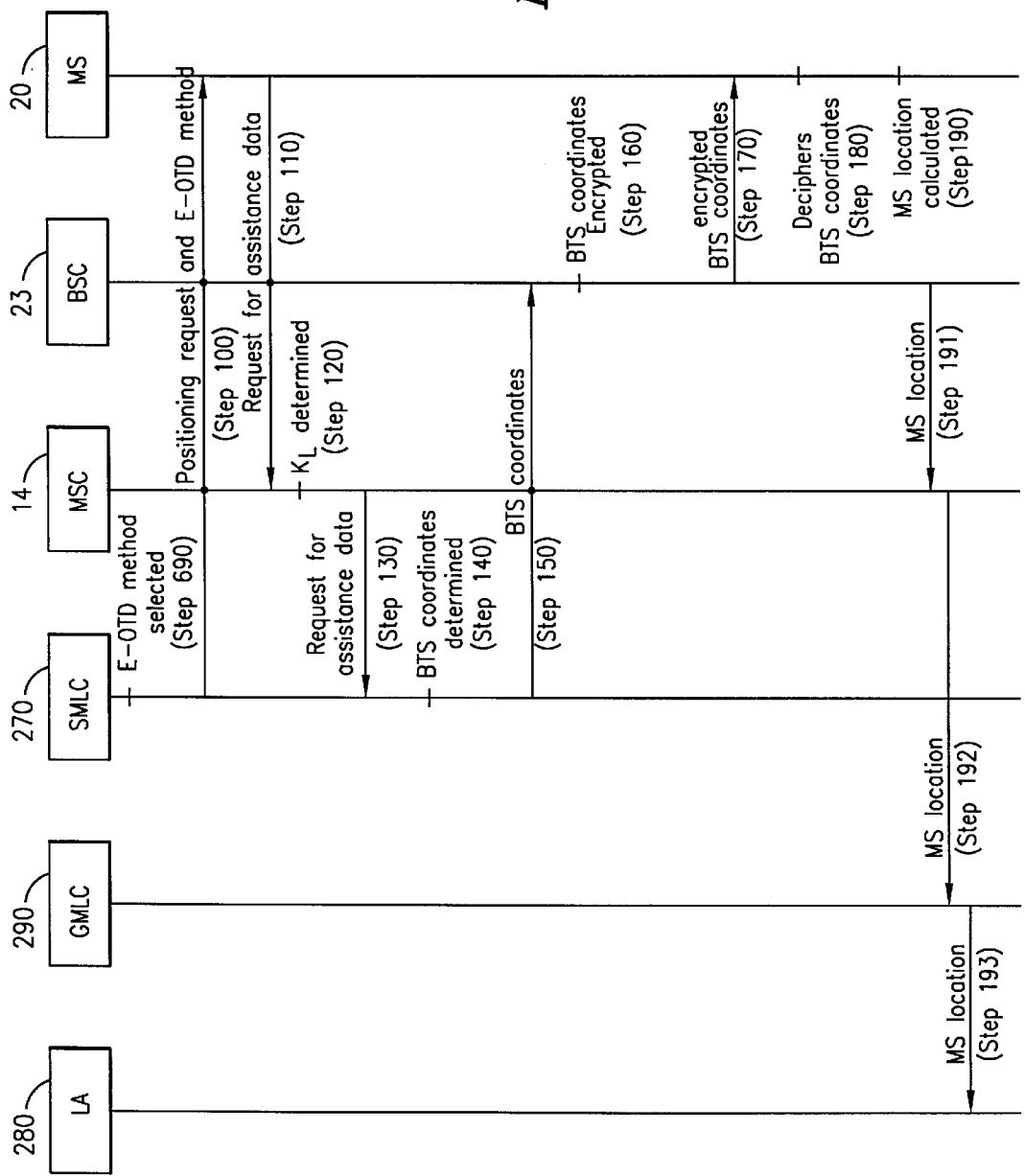
FIG. 10 shows steps in implementing the sample E-OTD positioning method shown in FIG. 9 of the drawings.

The second terminal-based positioning method is the E-OTD method. With reference now to FIG. 9 of the drawings, which will be described in connection with the steps listed in FIG. 10 of the drawings, the E-OTD method is based upon measurements in the MS 20 of the Enhanced Observed Time Difference of arrival of bursts from nearby pairs of BTS's 24a and 24b to the MS 20. To obtain accurate triangulation of the MS 20 position, E-OTD measurements are needed for at least three distinct pairs of geographically dispersed BTS's 24a and 24b, only one pair of which is shown in FIG. 9.

Thus, when the SMLC 270 receives the cell 22 ID and TA value (step 675 in FIG. 6) and decides to utilize the E-OTD positioning method (steps 680 and 690 in FIG. 6 and FIG. 10), the SMLC 270 sends the positioning request 285 and positioning E-OTD method to the MS 20 (step 100). The MS 20 sends the request for assistance data message 215 to the MSC 14 (step 110), shown in FIG. 4A of the drawings, which determines the location deciphering key $K_L$ (step 120) and forwards the request for assistance data message 215 to the SMLC 270 (step 130). The SMLC 270 obtains the requested assistance data 210 (step 140), e.g., BTS 24a and 24b coordinates, and transmits this network information 210 to the BSC 23 (step 150) via the MSC 14 for encryption (step 160) and transmission to the MS 20 (step 170). The MS 20 deciphers the network information 210 (step 180) and uses this network information 210 to perform the requested E-OTD measurements 222, shown in FIG. 4B, and compute an E-OTD location estimate 298 (step 190), as described hereinbefore in connection with FIG. 4B of the drawings. Thereafter, the MS 20 sends this calculated location information 298 back to the MSC 14 (step 191). The MSC 14 can forward the location 298 of the MS 20 to the GMLC 290 (step 192), which can, in turn, forward the location information 298 to the requesting LA 280 (step 193).

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

What is claimed is:

1. A telecommunications system for encrypting and deciphering network information broadcast to a plurality of mobile stations within a cellular network, comprising:

a mobile switching center within said cellular network for obtaining said network information, determining a location deciphering key, encrypting said network information using said location deciphering key and broadcasting said encrypted network information to said plurality of mobile stations; and a select one of said plurality of mobile stations for receiving said encrypted network information, determining said location deciphering key, said location deciphering key being associated with said select one of said mobile stations, deciphering said network information, using said location deciphering key, and calculating location information associated with the location of said select one of said mobile stations within said cellular network, using said deciphered network information.

2. The telecommunications system of claim 1, further comprising:

a home location register associated with said select one of said mobile stations and connected to said mobile switching center, said home location register for receiving a request for said location deciphering key from said mobile switching center, obtaining said location deciphering key and sending said location deciphering key to said mobile switching center.

3. The telecommunications system of claim 2, further comprising:

an authentication center attached to said home location register for obtaining a subscriber identification key associated with said select one of said mobile stations from said home location register and inputting at least said subscriber identification key to a ciphering algorithm to derive said location deciphering key.

4. The telecommunications system of claim 3, wherein said authentication center further inputs a random number to said ciphering algorithm to derive said location deciphering key.

5. The telecommunications system of claim 3, wherein said mobile switching center is further operable to receive a request for said network information from said select one of said mobile stations, said request for said network information including a positioning indication, said mobile switching center including said positioning indication in said request for said location deciphering key to said home location register, said authentication center further inputting said positioning indication to said ciphering algorithm to derive said location deciphering key.

6. The telecommunications system of claim 1, wherein said select one of said mobile stations further comprises a memory for storing a subscriber identification key, a positioning indication and a deciphering algorithm, said select one of said mobile stations determining said location deciphering key by inputting at least said subscriber identification key and said positioning indication to said deciphering algorithm to derive said location deciphering key.

7. A mobile station for deciphering broadcasted encrypted network information for use in calculating the location of said mobile station within a cellular network, comprising:
- a transceiver unit for receiving said encrypted network information broadcasted by said cellular network;
- a memory for storing a subscriber identification key, a positioning indication and a deciphering algorithm; and
- a deciphering module for receiving said encrypted network information from said transceiver unit, accessing said memory to retrieve said subscriber identification key, said positioning indication and said deciphering algorithm, inputting at least said subscriber identification key and said positioning indication to said deciphering algorithm to derive a location deciphering key and deciphering said encrypted network information using said location deciphering key.

8. The mobile station of claim 7, wherein said transceiver unit is further operable to receive a random number broadcasted by said cellular network and to forward said random number to said deciphering module, said deciphering module further inputting said random number to said deciphering algorithm to derive said location deciphering key.

9. The mobile station of claim 7, wherein said memory further stores said deciphered network information.

10. The mobile station of claim 9, further comprising:
- a positioning measurement module for receiving said deciphered network information from said deciphering module and obtaining at least one positioning measurement, using said deciphered network information.

11. The mobile station of claim 10, further comprising:
- a location calculation module for receiving said at least one positioning measurement from said positioning measurement module and calculating location information associated with the location of said mobile station within said cellular network, using said at least one positioning measurement and said deciphered network information stored in said memory.

12. The mobile station of claim 11, further comprising:
- a smart card having said location calculation module and said memory stored therein.

13. The mobile station of claim 7, further comprising:
- a comparison module for comparing a value associated with performed positionings with said positioning indication and invalidating said location deciphering key when said quantity equals or exceeds said positioning indication.

14. A method for encrypting network information broadcast to a mobile station for use by said mobile station in calculating the location of said mobile station within a cellular network, comprising the steps of:
- obtaining, by a mobile switching center in wireless communication with said mobile station, said network information;
- determining, by said mobile switching center, a location deciphering key;
- encrypting said network information using said location deciphering key; and
- broadcasting said encrypted network information to said mobile station.

15. The method of claim 14, wherein said step of determining further comprises the steps of:
- sending a request for said location deciphering key from said mobile switching center to a home location register associated with said select one of said mobile stations and connected to said mobile switching center;
- obtaining, by said home location register, said location deciphering key; and
- sending said location deciphering key from said home location register to said mobile switching center.

16. The method of claim 15, wherein said step of obtaining said location deciphering key by said home location register further comprises the steps of:
- obtaining, by an authentication center attached to said home location register, a subscriber identification key associated with said mobile station from said home location register; and
- inputting, by said authentication center, at least said subscriber identification key to a ciphering algorithm to derive said location deciphering key.

17. The method of claim 16, wherein said step of inputting further comprises the step of:
- inputting said subscriber identification key and a random number to said ciphering algorithm to derive said location deciphering key.

18. The method of claim 16, further comprising the step of:
- receiving, by said mobile switching center, a request for said network information from said mobile station, said request for said network information including a positioning indication.

19. The method of claim 18, wherein said step of sending said request for said location deciphering key further comprises the step of:
- sending said positioning indication in said request for said location deciphering key to said home location register.

20. The method of claim 19, wherein said step of inputting further comprises the step of:
- inputting said subscriber identification key and said positioning indication to said ciphering algorithm to derive said location deciphering key.

21. The method of claim 20, further comprising the step of:
- receiving, by said mobile switching center, a deciphering algorithm from said mobile station, said deciphering algorithm corresponding to said ciphering algorithm.

22. A method for deciphering encrypted network information received by a mobile station for use in calculating the location of said mobile station within a cellular network, comprising the steps of:
- receiving, by said mobile station, said encrypted network information broadcasted by said cellular network;
- retrieving, by said mobile station, a subscriber identity key, a positioning indication and a deciphering algorithm from a memory within said mobile station;
- inputting, by said mobile station, at least said subscriber identity key and said positioning indication to said deciphering algorithm to derive a location deciphering key;
- deciphering, by said mobile station, said encrypted network information, using said location deciphering key; and
- calculating location information associated with the location of said mobile station within said cellular network, using said deciphered network information.

23. The method of claim 22, further comprising the step of:
- receiving, by said mobile station, a random number broadcasted by said cellular network.

24. The method of claim 23, wherein said step of inputting further comprises the step of:

inputting said subscriber identification key, said positioning indication and said random number to said deciphering algorithm to derive said location deciphering key.

25. The method of claim 22, further comprising the step of:

storing said deciphered network information in said memory within said mobile station.

26. The method of claim 25, wherein said step of calculating further comprises the step of:

obtaining, by said mobile station, at least one positioning measurement, using said deciphered network information.

27. The method of claim 26, wherein said step of calculating further comprises the step of:

calculating said location information, using said at least one positioning measurement and said deciphered network information stored in said memory.

28. The method of claim 22, further comprising the steps of:

comparing, by said mobile station, a value associated with performed positionings with said positioning indication; and invalidating said location deciphering key when said quantity equals or exceeds said positioning indication.

* * * * *